Jan. 15, 1957  J. B. SCHMITT ET AL  2,777,935
ELECTRIC VAPORIZER
Filed Dec. 19, 1955

INVENTOR.
JOY B. SCHMITT
WILLIAM H. CORBETT
BY
W. P. Carr
ATTORNEY

United States Patent Office 2,777,935
Patented Jan. 15, 1957

2,777,935
ELECTRIC VAPORIZER

Joy B. Schmitt and William H. Corbett, Somerset, Pa., assignors to The De Vilbiss Company, Toledo, Ohio, a corporation of Ohio Application December 19, 1955, Serial No. 553,904

5 Claims. (Cl. 219—40)

This invention relates to vaporizers utilizing an electrical heating element for generating steam and particularly to such a device adapted to provide steam vapor either alone or in combination with a vaporized medicament for the treatment of colds, coughs, bronchitis and other disorders of the respiratory system. Such devices are well known and have long been used in considerable number with beneficial results.

Because of the electrical circuit and the presence of water the hazard of possible electrical shock is always present. Another objectionable feature of these devices is the accumulation of precipitants from the water upon the electrodes and elsewhere which interferes with proper functioning.

One object of this invention is the provision of an electrical vaporizer that has an improved factor of safety.

A further object is to provide an instrument that is simple in design and may be made available at a low price.

Another object is the provision of a vaporizer that may be easily and quickly cleaned.

These and other objects and advantages of the invention will be more apparent upon reading the following description and referring to the accompanying drawings in which.

Figure 1:
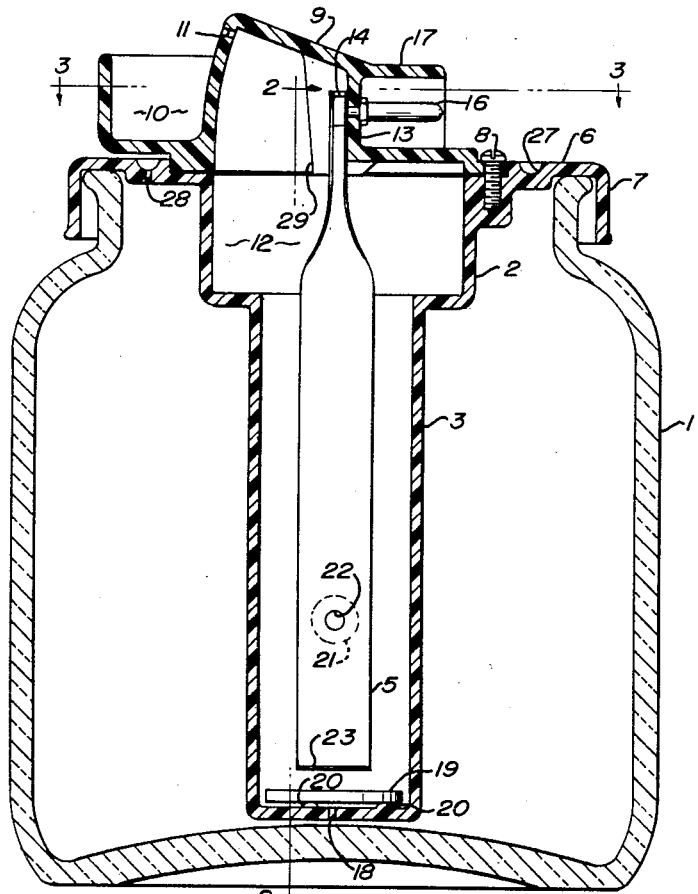
Figure 1 is a vertical section of a vaporizer embodying this invention.
Figure 2:
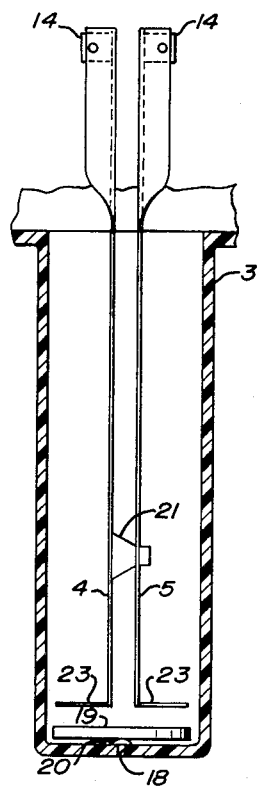
Figure 2 is a vertical section taken on line 2—2 of Figure 1 showing the electrodes forming the heating element and the casing enclosing the electrodes.
Figure 3:
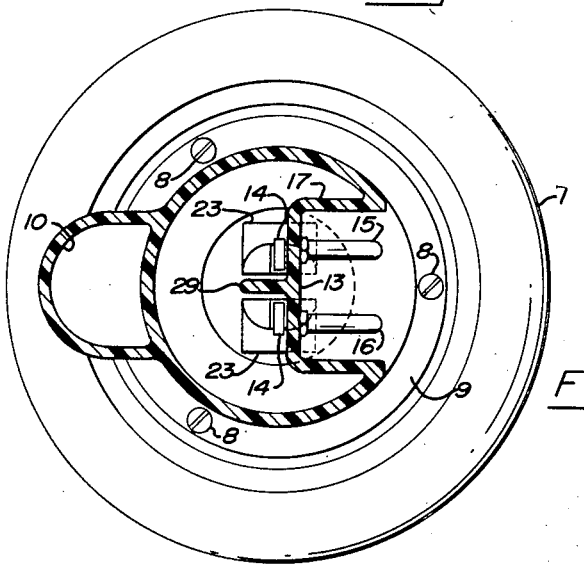
Figure 3 is a horizontal section taken on the line 3—3 of Figure 1.

The vaporizer illustrated in the drawings has a receptacle 1 for the water from which the steam is generated. Positioned upon and extending into the receptacle is a generally cylindrical casing 2 forming a housing 3 within the receptacle for the heating electrodes 4 and 5. The casing has a radially projecting border 6 with a downwardly turned flange 7 which fits around the neck of the receptacle.

Upon the casing secured by bolts 8 is a cover 9 having an exterior well 10 for holding any medicament to be vaporized and to be combined with the steam issuing from discharge port 11 and passing over the well. Within the cover in communication with discharge port 11 is steam expansion chamber 12.

The electrodes 4 and 5 of duplicate shape are suspended in housing 3 from the rearward wall 13 of the steam chamber 12. They are held in place by square nuts 14 on the threaded ends of terminals 15 and 16 which extend through the wall 13 from the enclosure 17. This enclosure is open on the side away from the wall 13 for the reception of an electrical plug into engagement with the terminals.

The lower end of the electrode housing 3 is centrally ported at 18 for the restricted entry of water from the receptacle.

A flat disc 19 rests loosely at the bottom of the housing upon three small protuberances 20 which keep the disc from closing contact with the port 18. This disc prevents any metal cleaning instrument from reaching an electrode through port 18 and forming a short circuit whereby the user could receive a severe electrical shock.

The main portion of the electrodes 4 and 5 are flat strip form held in spaced relation by a ceramic button 21 having a reduced cylindrical end which extends through an accommodating hole 22 in either one of the electrodes.

The upper end of each electrode is U-shaped in horizontal section, its sides being bent toward each other into parallel relationship in planes normal to that of the flat main portion of the electrode. Through this shaping the electrodes present flat areas to which the horizontally positioned terminals 15 and 16 may be readily attached by nuts 14. A fin 29 from wall 13 provides an insulating partition between the upper ends of the electrodes. The lower ends of the electrodes are bent sharply away from each other to form feet 23. They prevent undue separation of the electrodes as their ends would meet the inner wall of the housing 3 upon slight lateral movement.

In operating the vaporizer of this invention the glass jar constituting the water receptacle 1 is filled about three quarters full with ordinary tap water which usually carries enough minerals to support satisfactory operation of the vaporizer. If the mineral content is exceptionally high the electrolytic action between the electrodes causes excessive boiling. Such water may be tempered by adding rain water or commercial distilled water. At the other extreme, tap water may be too soft and a pinch of salt must be added to form an electrolyte to speed up the boiling action.

With the vaporizer replaced over the receptacle any desired medicament is placed in the well 10 but preferably not more than enough to half fill it. Tincture of benzoin is frequently used as its vapors are generally beneficial. The plug of an attachment cord is then slipped over terminals 15 and 16.

The lateral entry of the plug into the terminal enclosure 17 is considerably safer than the usual open topped terminal housing, as water or medicine spilled from above the vaporizer or condensed steam settling upon the vaporizer is shielded from the terminals. As such liquid could build a short between the terminals or to the hand of a person moving the vaporizer there is real reason to guard against such an accident. An annular gutter 27 around the top of the casing 2 drains any water collecting there through passage 28 into the receptacle 1.

With the current reaching electrodes 4 and 5 electrolytic action through water between the electrodes results and this water is brought to a boiling temperature within a short interval. The steam vapor formed rises from housing 3 into the steam chamber 12 bounded on the lower half by the enlarged section of the cylindrical casing 2 and on the upper half by the interior cavity of cover 9. The steam under its own pressure is projected through discharge port 11 as a strong flaring stream.

It may be noted that the medicament well 10 is air insulated on three sides and bottom but receives heat from the steam chamber through the wall below discharge port 11. Consequently vapor arises from the medicament more strongly in the vicinity of this wall and is thus more subject to the aspirating effect of the steam jet and is more readily drawn up into confluence and travel with the steam. Accordingly, little of the medicinal vapor is lost through vagrant dissipation and that combined with the steam is effectively carried to the person under treatment.

It is the opinion of many physicians that steam vapor alone is therapeutic and may be applied for several hours or overnight. The vaporizer of this invention is provided with a water capacity capable of sustaining steam discharge at a high rate for extended periods of treatment up to eight or ten hours long.

The length of automatic operation is of course proportional to the amount of water placed in the receptacle. As the water is boiled away the water level recedes below the lower ends of the electrodes breaking the flow of current and terminating steam formation.

When it is desired to disassemble the vaporizer for periodic cleaning to remove mineral deposits from the electrodes and the interior of casing 3, the cover 9 is easily separated from the casing by unscrewing bolts 8. In order to prevent exposing the electrodes while they still carry an electrical charge, one of the bolts 8 is positioned beneath the attachment plug when the latter is in contact with the terminals 15 and 16. Accordingly, to remove the bolt it is first necessary to withdraw the attachment plug breaking the electrical connection.

Although a particular embodiment of this invention has been shown and described, it will be understood that various modifications may be made without departing from the scope of the invention.

What we claim is:

1. In an electric steam vaporizer of the type described, a receptacle for the water to be heated, a pair of vertically elongated electrodes of generally strip form extending into the receptacle and constituting a heating element, the main portion of each electrode being flat in a vertical plane and in opposed, parallel, spaced relation with the main portion of the other electrode, the upper end of each electrode being flattened in a vertical plane ninety degrees crosswise of the plane of the main portion and offset from that side of the main portion facing away from the main portion of the other electrode, and a pair of electrical terminals lying parallel in a horizontal plane with each fixed to the upper end of one of the electrodes.

2. An electric steam vaporizer according to claim 1 having an insulating casing extending completely over and surrounding the terminals on three sides with the other side open for the introduction of an electrical plug into engagement with the terminals.

3. An electric steam vaporizer according to claim 1 having a spacer fitting between the electrodes, said spacer having a reduced cylindrical end adapted to extend into a hole in one of the electrodes, the other end of the spacer being of truncated conical form flaring from the reduced conical end, the large base of the truncated conical end adapted to flatly abut the other electrode.

4. In an electric steam vaporizer, a receptacle for the water to be heated, a plastic cover for the receptacle, an electric heating unit, means suspending the heating unit in steam generating relation with water in the receptacle, means forming a steam chamber under the cover and a steam discharge port from the chamber into the atmosphere, an open topped medicine container exteriorly below the steam discharge port and integral with the cover, the container being formed as a projection from the cover with insulating air space below and on three sides, the fourth side having a wall common with the steam chamber whereby heat from the chamber passing through said wall reaches the medicine adjacent the wall, whereby medicine in the portion of the container immediately below the steam discharge port is vaporized and rises into confluence with the steam issuing from the steam discharge port.

5. In an electric steam vaporizer, a receptacle for the water to be heated, a cover for the receptacle, an electrical heating element suspended from the cover into the receptacle, terminals for the electrodes on the cover for receiving an electrical attachment plug, a casing for the electrodes, and a releasable fastener joining the casing to the cover, said fastener being positioned adjacent the terminals at a point where it is inaccessible when an attachment plug is in contact with the terminals, whereby the attachment plug must be disconnected before the cover and casing may be separated and the electrodes exposed.

References Cited in the file of this patent
UNITED STATES PATENTS

| | | |
|---|---|---|
| 1,806,729 | Aitken | May 26, 1931 |
| 1,922,958 | Katzman | Aug. 15, 1933 |
| 2,347,825 | Hanks | May 2, 1944 |
| 2,533,794 | Hanks et al. | Dec. 12, 1950 |
| 2,606,276 | Maguth | Aug. 5, 1952 |
| 2,624,924 | Duberstein | Jan. 13, 1953 |
| 2,713,628 | Barkin | July 19, 1955 |